United States Patent [19]
Schmitz et al.

[11] Patent Number: 6,081,413
[45] Date of Patent: Jun. 27, 2000

[54] METHOD OF CONTROLLING ARMATURE MOVEMENTS IN AN ELECTROMAGNETIC CIRCUIT

[75] Inventors: Günter Schmitz; Martin Pischinger; Hans Kemper, all of Aachen, Germany

[73] Assignee: FEV Motorentechnik GmbH & Co. KG, Aachen, Germany

[21] Appl. No.: 09/134,908

[22] Filed: Aug. 17, 1998

Related U.S. Application Data

[62] Division of application No. 08/648,573, May 16, 1996, Pat. No. 5,818,680.

[30] Foreign Application Priority Data

May 17, 1995 [DE] Germany ............... 195 18 056

[51] Int. Cl.$^7$ ................................. H01H 9/00
[52] U.S. Cl. ............................ 361/160; 361/210
[58] Field of Search ..................... 361/206, 160, 361/210, 167; 340/644; 324/418, 422, 423, 207.11, 207.13, 207.24, 207.26

[56] References Cited

U.S. PATENT DOCUMENTS

| | | | |
|---|---|---|---|
| 4,455,543 | 6/1984 | Pischinger et al. | 335/266 |
| 4,544,986 | 10/1985 | Buchl | 361/152 |
| 5,813,653 | 9/1998 | Esch et al. | 251/129.1 |
| 5,818,680 | 10/1998 | Schmitz et al. | 361/160 |
| 5,822,167 | 10/1998 | Schmitz | 361/143 |

FOREIGN PATENT DOCUMENTS

| | | |
|---|---|---|
| 0 264 706 | 4/1988 | European Pat. Off. . |
| 0 405 189 | 1/1991 | European Pat. Off. . |
| 30 24 109 | 9/1989 | Germany . |

*Primary Examiner*—Fritz Fleming
*Attorney, Agent, or Firm*—Venable; Gabor J. Kelemen

[57] ABSTRACT

A method for controlling armature movement in an electromagnetic circuit includes the steps of providing two spaced, facing electromagnets and an armature movable between the two electromagnets along a motion path; alternatingly energizing the two electromagnets for causing a reciprocating motion of the armature; detecting the actual moments of passage of the armature during each motion from one electromagnet to the other at least at two consecutive locations along the motion path; comparing signals representing the actual moments of passage with signals representing desired moments of passage of the armature at the two locations; and dependent upon deviations determined in the signal-comparing step, controlling the moment of de-energizing the momentarily releasing electromagnet and controlling the moment of energizing the momentarily catching electromagnet.

4 Claims, 14 Drawing Sheets

METHOD OF CONTROLLING ARMATURE MOVEMENTS IN AN ELECTROMAGNETIC CIRCUIT

CROSS REFERENCE TO RELATED APPLICATION

This application is a division of application Ser. No. 08/648,573, filed May 16, 1996, now U.S. Pat. No. 5,818,680.

This application claims the priority of German Application No. 195 18 056.9 filed May 17, 1995, which is incorporated herein by reference.

BACKGROUND OF THE INVENTION

This invention relates to electromagnetic circuits and is more particularly directed to a method of controlling the motion of an armature forming part of the circuit.

For many applications it has been found to be advantageous to monitor the motion of the solenoid armature in an electromagnetic circuit for energizing the holding magnet as a function of such a motion.

Electromagnetic circuits of the above-outlined type are used, for example, for controlling the intake and exhaust valves (hereafter also referred to collectively as cylinder valves) in internal combustion engines to obtain an adaptable control for the intake and exhaust of gases for the eventual purpose to optimally affect the operation based on requirements. The course of the control has a substantial effect on widely different parameters, for example, the conditions of the working medium in the intake region, in the work chamber and in the exhaust region as well as the conditions in the combustion chamber itself. Since internal combustion engines operate in a non-stationary manner under widely different operational conditions, a variable control of the cylinder valves is a desideratum. Such an electromagnetic circuit for cylinder valves is disclosed, for example, in German Patent No. 3,024,109.

A significant problem in the control of electromagnetic circuits of the above type involves the required timing accuracy which is needed in particular for the intake valves when the engine output is controlled. An accurate timing control is rendered difficult by manufacturing tolerances, wear appearing during operation as well as different operational conditions, for example, changing load requirements and operating frequencies, because these external influences may affect time-relevant parameters of the system.

A significant problem in electromagnetic circuits is the adherence (sticking) of the armature to the holding magnet. Such a phenomenon is caused mostly by eddy currents in the magnetic circuit. The sticking period depends from many different parameters such as the size of the air gap, the force exerted by the resetting means, usually formed of mechanical springs and from the counterpressure of the gases in case of cylinder valves. In addition to the unavoidable manufacturing tolerances in electromagnetically operated cylinder valves, the alternating gas counterpressures cause irregular fluctuations of the sticking period so that after a de-energization of the holding current, the motion start of the armature varies in an unpredictable manner. The stroke period too, as well as the energy losses and thus the energy to be supplied depend from the momentary operational conditions. By detecting the armature position during its motion between the two holding magnets, a compensation for the above-discussed influences would seem feasible. Such a compensation could be effected, for example, by a path sensor positioned between the two holding magnets. Such sensor can detect the moment—related to the control periods—when the armature moves past and can apply a signal to the control device so that the energization of the holding magnets may be affected by computer support. For use in electromagnetically controlled cylinder valves such a solution has value practically only in experimental engines. In the mass manufacture such an additional path sensor cannot be considered because of the high cost of the sensor itself and because of the required additional wiring of the contact locations which adversely affects the reliability of the entire system.

Tests have been previously conducted in an attempt to alleviate the problems with the aid of the available circuit components. This may be done, for example, by the evaluation of currents or voltages of the solenoids of the holding magnets by means of which the moment of impact of the armature on a holding magnet is detected (as disclosed, for example, in published European Application 0 264 706) or the moment of separation of the armature from the holding magnet is sensed. The velocities of the armature are, however, very low in the end position, so that even in case of a relatively good resolution of the signals representing such position, the time association which can be derived therefrom has not been found to be satisfactory. Accordingly, for improving such electromagnetic circuits, particularly to actuate cylinder valves, published European Application 0 405 189 proposes to improve the time accuracy by increasing the bias of the resetting means effective in the opening direction, and additional measures have been provided for changing the magnetic resistance in the magnetic circuit.

SUMMARY OF THE INVENTION

Since neither mechanical means as proposed in published European Patent Application 0 405 189 nor the computing methods discussed in published European Patent Application 0 264 706 satisfy the accuracy requirements, it is an object of the invention to provide an improved method of the above-outlined type which makes possible a detection of the armature motion by detecting arbitrary armature positions without additional sensors or contact points.

This object and others to become apparent as the specification progresses, are accomplished by the invention, according to which, briefly stated, the method for controlling armature movement in an electromagnetic circuit includes the steps of providing two spaced, facing electromagnets and an armature movable between the two electromagnets along a motion path; alternatingly energizing the two electromagnets for causing a reciprocating motion of the armature; detecting the actual moments of passage of the armature during each motion from one electromagnet to the other at least at two consecutive locations along the motion path; comparing signals representing the actual moments of passage with signals representing desired moments of passage of the armature at the two locations; and dependent upon deviations determined in the signal-comparing step, controlling the moment of de-energizing the momentarily releasing electromagnet and controlling the moment of energizing the momentarily catching electromagnet.

The arrangement according to the invention has the advantage that during current flow through the solenoid the armature is attracted to the pole face. During this occurrence the armature moves past the measuring poles so that a short-period increase in the inductivity occurs which may be evaluated as a time-related signal. If the moment at which the armature sweeps by the measuring pole coincides with a moment predetermined by operational data, that is, the armature moves past the measuring pole "on time", then no deviation occurs. If, on the other hand, the armature passes by the measuring pole too early or with a delay, then such a time difference may be detected and in the successive operating cycle the solenoid of the holding magnet may be supplied with current at an earlier or later moment. The particular advantage of the apparatus according to the invention resides in the fact that without additional wiring an accurate time-related detection of the armature motion is feasible with the aid of the already-available electric system. The underlying principle of the invention resides in that a magnetic circuit is formed with the magnet yoke, its solenoid, the armature and one or two measuring pole legs (dependent upon the design), making possible the generation of a measuring signal by means of changing the inductivity as influenced by the armature motion. A particular advantage of the invention also resides in the fact that by arranging, on the measuring pole leg, several measuring poles which are spaced from one another along the motion path of the armature and which are oriented towards the armature, the measuring accuracy can be further increased because the motion of the armature may be detected in a time-related manner as the armature moves past the measuring poles.

According to a further feature of the invention, for forming the magnetic circuit, only a single measuring pole leg is connected with the magnet yoke and further, the measuring pole leg is provided with a permanent magnet. In this manner, within the measuring pole leg a magnetic circuit is formed which, by virtue of the connection of the measuring pole leg with the magnet yoke, further amplifies the signal generated upon the passage of the armature.

According to a further feature of the invention, the measuring pole leg is provided with at least two permanent magnets, each arranged between two consecutive measuring poles with a polarity opposite to one another. By virtue of this arrangement, from the polarity of the measured voltage it may be determined which measuring pole has the armature just passed.

For reducing the magnetic resistance in case of an arrangement of several measuring poles at the measuring pole leg, according to a further feature of the invention, in addition to a reduction of the air gap between the measuring poles and the armature, the intermediate spaces between the successive measuring poles are filled with a poorly magnetizable material.

According to a further feature of the invention, the measuring pole leg is provided with at least two measuring poles and further, between any two measuring poles an induction coil is arranged and a permanent magnet is provided which forms a magnetic circuit with the armature, the measuring pole leg and the measuring poles. Such an arrangement has the advantage that the excitation of the magnetic circuit need not be effected by an additional magnetizing current applied to the solenoid itself but that the magnetic flux, present in the magnetic circuit by virtue of the permanent magnet, is altered because of the armature motion and induces a voltage in the induction coil. Although with the provision of the induction coil an additional electric component is present, the number of connections to the electronic system may be maintained small by virtue of the fact that the measuring coil is connected parallel to the solenoid of the holding magnet. The current outflow caused by such a shunt arrangement is negligibly small because upon a sudden voltage change the current does not change suddenly due to the inductive behavior.

According to a further advantageous feature of the invention, the armature is, on its side oriented towards the measuring pole leg, provided with at least one projecting pole nose or pole lug. By virtue of such arrangement an increase of the accuracy is possible particularly in case of a relatively thick armature. To compensate for the smaller effective cross section, the pole lug is expediently relatively wide and may, in certain cases, exceed the entire armature width.

According to a further advantageous feature of the invention, the armature is provided with a plurality of pole lugs and the measuring pole leg is provided with a plurality of measuring poles. Such a comb-like construction results not only in a further increase of the surface area while preserving the obtained sensitivity increase but also results in a fine resolution because regions with a large air gap and regions with a small air gap alternate with a half period of the comb structure, so that as the armature travels, small and large magnetic resistances alternate. Thus, for evaluation purposes, along the path of the armature several signals are obtained which may be utilized for a more accurate monitoring of the motion path of the armature. The accuracy, that is the resolution of the position-recognition may be further improved by the accurately determined positions of the individual measuring poles. Thus, for example, by dividing one measuring pole leg pair into ten measuring pole pairs and the other into nine measuring pole pairs, an improvement of the resolution may be realized in a vernier-like manner. Such a possibility for increasing the accuracy or sensitivity may also be obtained in case of a single measuring pole pair by offsetting the measuring poles relative to one another in the direction of the armature motion. In this manner, the region of overlap of the cross sections in which the magnet lines are interrupted only by small air gaps is significantly reduced. As a result, there is obtained a significantly sharper peak as the armature moves past.

DESCRIPTION OF THE PREFERRED EMBODIMENTS

Figure 1:
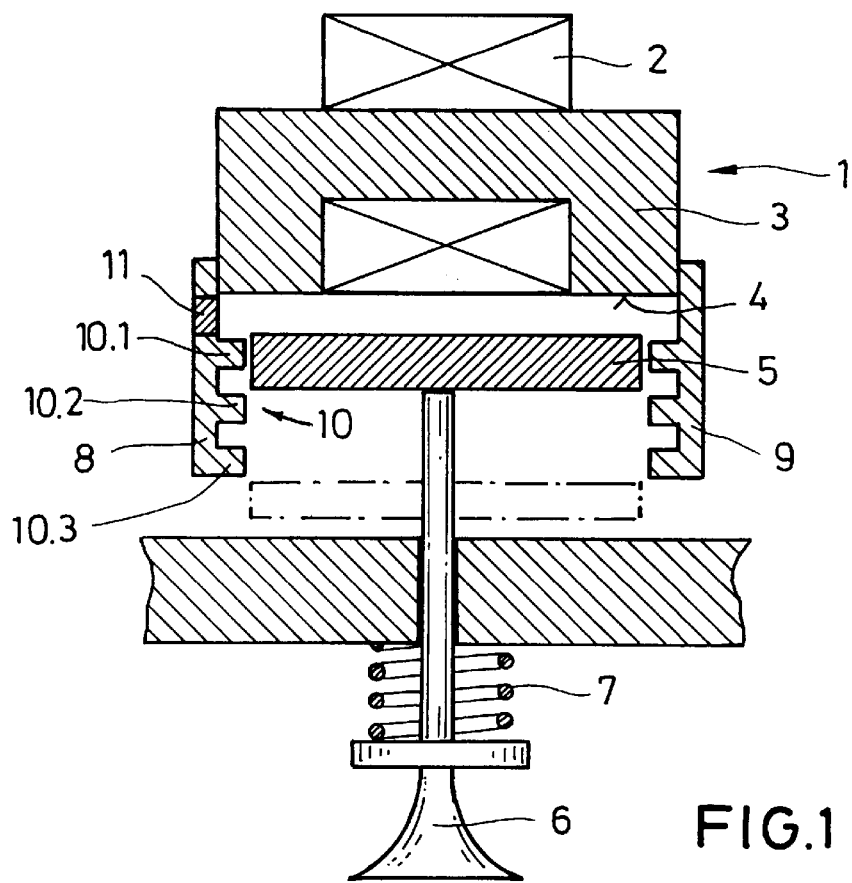
FIG. 1 is a sectional side elevational view of a basic preferred embodiment according to the invention.

The device schematically shown in FIG. 1 for controlling the armature movement in an electromagnetic circuit includes an electric holding magnet 1 provided with a solenoid 2 and a magnet yoke 3. The pole face 4 of the magnet yoke 3 is oriented towards a displaceable armature 5 which is coupled with a setting member 6 to be actuated. The setting member 6 is held by a resetting mechanism, such as a return spring 7, in a basic position in which the armature 5 is shown in dash-dot lines. The solenoid 2 is coupled with a non-illustrated current supply as well as an electronic measuring device.

To the magnet yoke 3 two measuring pole legs 8 and 9 are secured which flank the armature 5 and which are provided with a plurality of measuring poles 10 such as 10.1, 10.2 and 10.3. The measuring poles 10 are oriented towards the outer edge of the armature 5 and define therewith a narrow air gap. Upon energization of the solenoid 2 the armature 5 is attracted by the holding magnet 1 and thus the armature moves past the measuring poles 10, generating a short-period increase in the inductivity. As a result, particular voltage values occur at the moment of passage of the armature at the measuring poles. Such voltage values may be evaluated and based thereon a signal may be generated and applied to the circuit which energizes the holding magnet 1, as will be discussed in further detail below. This arrangement makes possible a time-dependent position indication.

By arranging a permanent magnet 11 at least at one of the measuring pole legs (in the instant example at the measuring pole leg 8), an additional magnetic circuit is obtained which results in an amplification of the signal.

Figure 2:
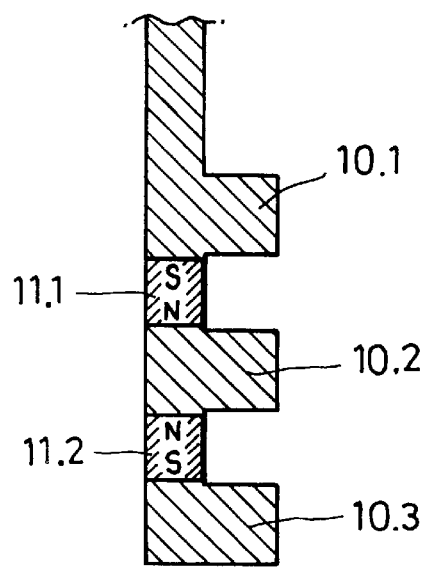
FIG. 2 is an enlarged fragmentary sectional side elevational detail of a variant of the structure illustrated in FIG. 1.

If, as shown in FIG. 2, between adjoining measuring poles 10.1 and 10.2 as well 10.2 and 10.3 a respective permanent magnet 11.1 and 11.2 is arranged such that their polarity is oppositely oriented, then from the alternating polarity of the measured voltage it may be ascertained which particular measuring pole pair is just being passed by the armature 5.

It is apparent that, as an alternative, the permanent magnet 11.1 may be arranged in the measuring pole leg 8 and the permanent magnet 11.2 may be arranged in the measuring pole leg 9 in an opposite orientation and in an offset manner relative to the armature path, resulting in a simplified construction. The above-described changes in the inductivity will appear as the armature 5 moves into the position of rest (basic position) under the effect of the spring 7 toward or away from the holding magnet 1. By virtue of this arrangement, the energization of the holding magnet with the catching current and the de-energization of the catching current or the holding current from the holding magnet, and thus the moment of release of the armature from the pole face 4 of the holding magnet 1 may be influenced based on the recognition of the exact momentary position of the armature during its motion.

Figure 3:
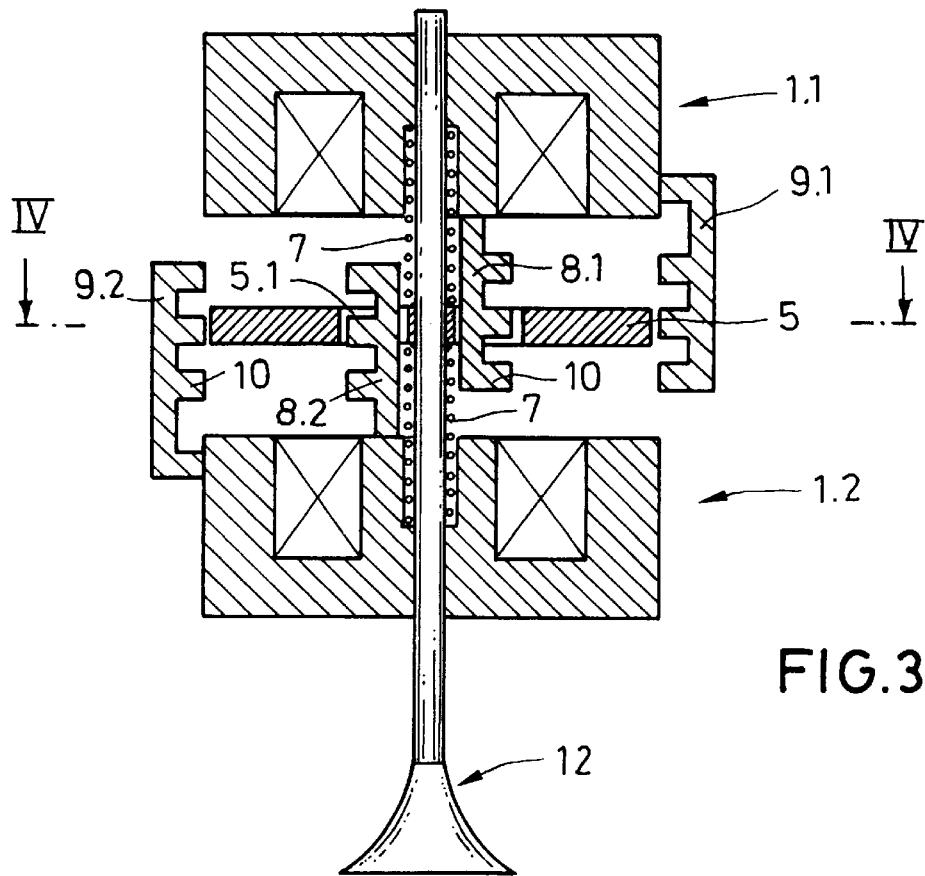
FIG. 3 is a sectional side elevational view of another preferred embodiment of the invention for operating a cylinder valve.

FIG. 3 illustrates the application of an electromagnetic circuit of the above-described type for controlling a cylinder valve in an internal combustion engine which is considered to be a principal use of such a circuit. Such an arrangement has a holding magnet 1.1 operating as a closing device and a holding magnet 1.2 operating as an opening device. The position of rest (basic position) of the armature 5 is situated in the mid position between the two holding magnets 1.1 and 1.2. The armature 5 is held in this position by two resetting devices, such as return springs 7 which exert oppositely oriented forces.

Figure 4:
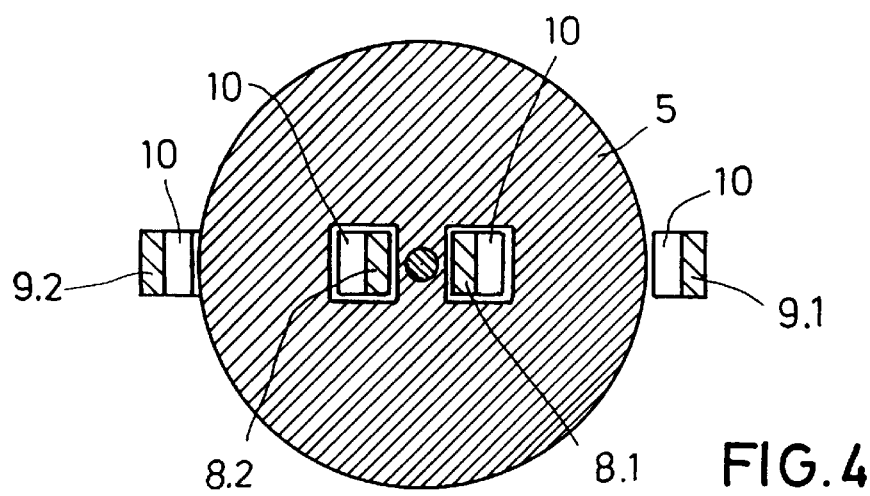
FIG. 4 is a sectional view taken along line IV—IV of FIG. 3.

The holding magnets 1.1 and 1.2 are each provided with two measuring pole legs 8.1, 9.1 and 8.2, 9.2, respectively. Components 8.1 and 8.2 are inner measuring pole legs, whereas components 9.1 and 9.2 are outer measuring pole legs. Each measuring pole leg has a plurality (for example, three) measuring poles 10. As illustrated in FIG. 4, the inner measuring pole legs 8.1 and 8.2 pass through a corresponding opening 5.1 in the armature 5, while the outer measuring pole legs 9.1 and 9.2 flank the armature 5 from the outside.

In operation, by means of a corresponding control, the cylinder valve 12 carried by the armature 5 may reciprocate between the two holding magnets 1.1 and 1.2 and in response to an appropriate control, may be held for predetermined periods at the one or the other holding magnet.

It is assumed that the valve 12 is maintained in its closed position by the holding magnet 1.1. For opening the valve 12, the holding current applied to the holding magnet 1.1 has to be switched off and the holding current for the holding magnet 1.2 has to be switched on. This causes the armature 5 to be attracted by the holding magnet 1.2 so that, as a result, the cylinder valve 12 is moved into its open position. During this occurrence, the armature 5 moves past the measuring poles 10 of the two pairs of measuring pole legs so that corresponding signals may be taken off from the solenoids of the holding magnets 1.1 and/or 1.2, as will be discussed in further detail below.

Figure 5:
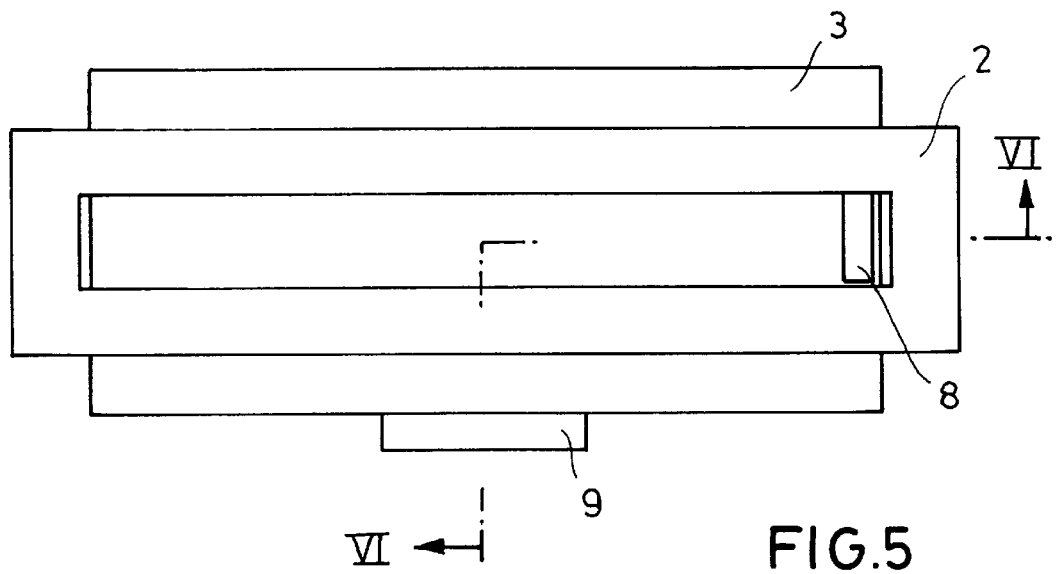
FIG. 5 is a top plan view of a holding magnet according to the invention.
Figure 6:
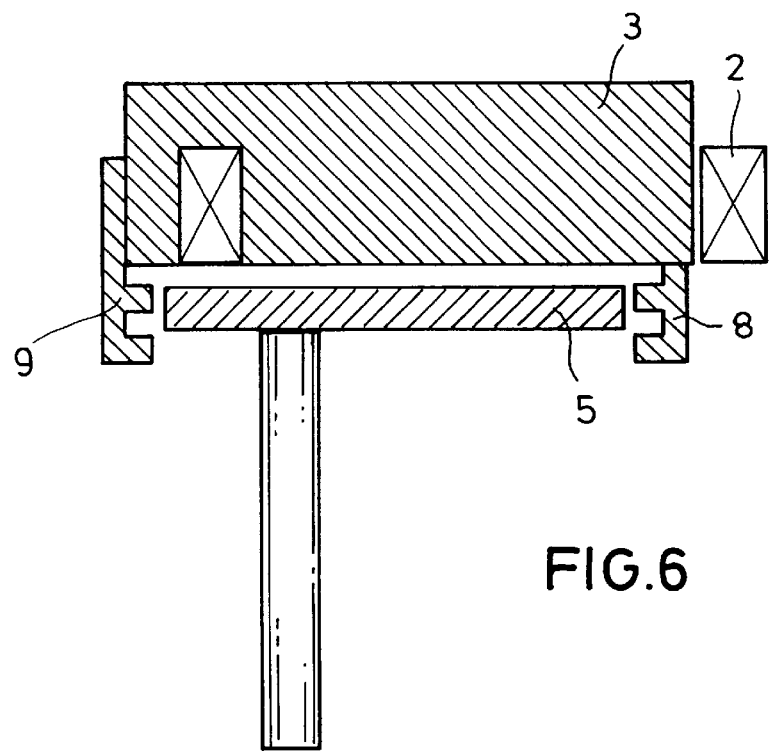
FIG. 6 is a sectional view taken along line VI—VI of FIG. 5.

FIGS. 5 and 6 illustrate a different construction for the holding magnets. While in FIG. 3 a "pot-shaped" magnet is shown which, because of its configuration, is difficult to install in the narrow space available in internal combustion engines, the structure shown in FIGS. 5 and 6 is rectangular which permits relatively large and thus powerful magnets to be accommodated in the narrow space above the cylinder head of the internal combustion engine. The magnet yoke 3 is of rectangular shape and has, for receiving the likewise rectangular solenoid 2, two longitudinal grooves so that in addition to the advantageous dimensioning a simplification of manufacture is also achieved. The offset arrangement of the measuring pole legs 8 and 9 permits to design the measuring pole leg 9 such that it extends over the entire width of the armature 5. Thus, even if narrow measuring pole noses are present, as shown in FIG. 8, the disadvantageous effect of the smaller effective cross section is compensated for.

Figure 7:
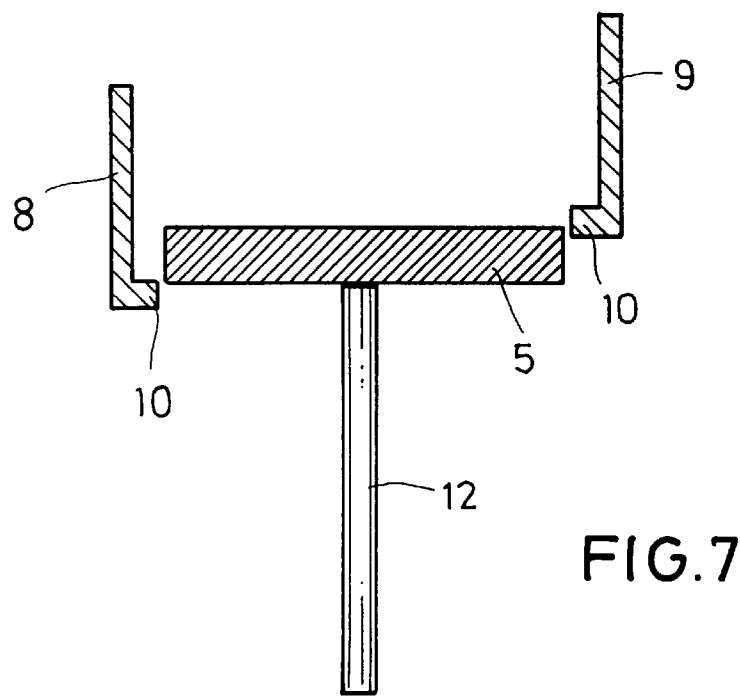
FIG. 7 is a sectional side elevational view of an arrangement of measuring poles for increasing sensitivity.

To increase the accuracy, that is, the sensitivity of each individual measuring pole pair, it is further feasible, as shown in FIG. 7, to arrange the measuring poles 10 of the measuring pole legs 8 and 9 in an offset position to one another, relative to the motion path of the armature. In this manner, the intersecting region of the cross sections, that is, the region in which the flow of the magnetic lines is interrupted only by small air gaps, is significantly reduced. As a result, as the armature moves past the measuring poles, significantly sharper signal peaks are obtained.

Figure 8:
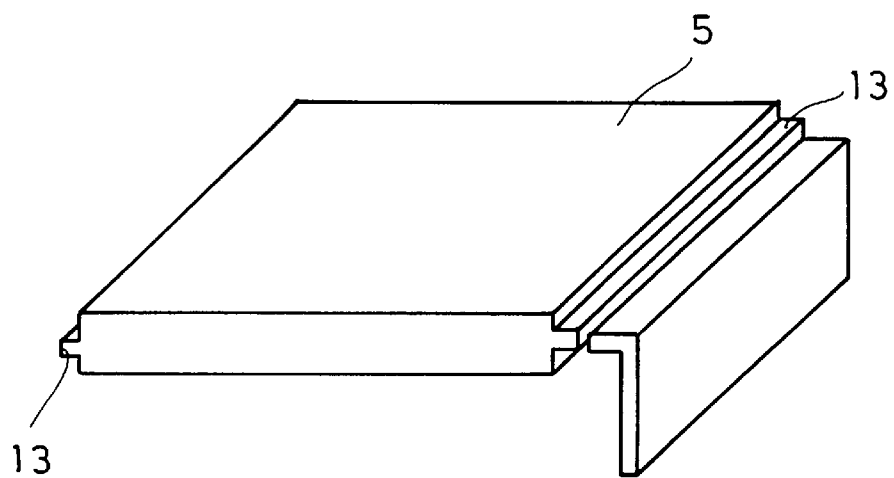
FIG. 8 is a perspective view of the measuring poles for increasing the sensitivity, according to a variant of the structure illustrated in FIG. 7.

FIG. 8 illustrates a configuration in which, for structural reasons, a "thick" armature 5 is provided with more slender pole noses 13 to increase the accuracy.

Figure 9:
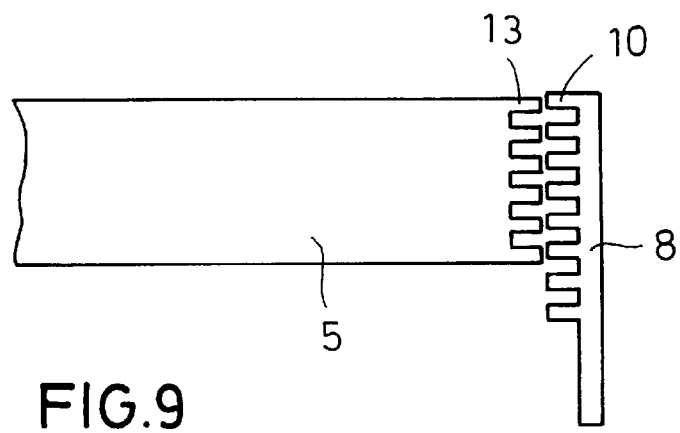
FIG. 9 is a side elevational view of yet another embodiment of the measuring poles for increasing the sensitivity.

As illustrated in FIG. 9, a further possibility is provided to increase the surface while preserving the sensitivity increase by arranging the measuring poles 10 on the measuring pole leg 9 and the pole noses 13 on the armature 5 in a comb-like pattern. In this arrangement, regions with a large air gap alternate with regions with a small air gap based on a fine resolution (one-half of the periodicity of the comb structure), so that upon motion of the armature 5 small magnetic resistances alternate with high magnetic resistances. Thus, along the armature path several signals are obtained which may be utilized to achieve an even more accurate observation of the motion path.

As a variant of the FIG. 9 construction, the comb structure may be designed as a separate measuring armature independently from the armature dimensions and independently from the structural arrangement of the armature and thus may be located at any other parts whose path is to be measured. Thus, in case of a cylinder valve, an additional measuring armature which closes the magnetic circuit may be carried by the valve stem. By virtue of the fact that the solenoid armature (working armature) itself need not be involved with the measuring poles and the generation of signals, it is feasible, for example, to make the working armature from a usual single-block soft iron while the measuring armature, for reducing eddy currents, may be made from iron sheets or sintered material so that even in case of high velocities of the element to be operated, the accuracy of the measurement is not influenced by excessive periods of relaxation of the material.

Figure 10:
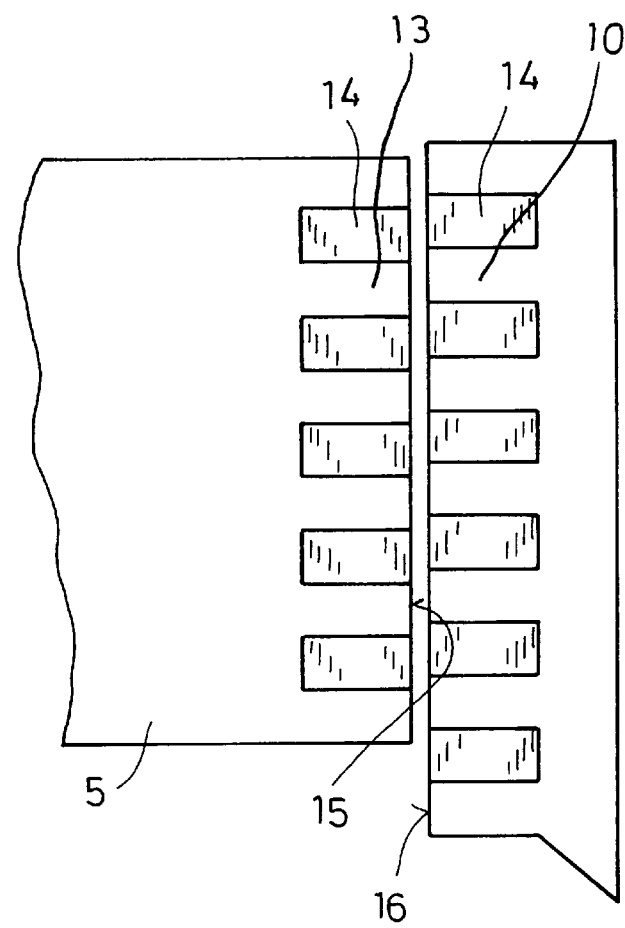
FIG. 10 is a side elevational view of a further embodiment based on the FIG. 9 structure.

A further possibility of reducing the magnetic resistance resides in the reduction of the air gap between the measuring poles 10 and the armature 5. As shown in FIG. 10, for this purpose the measuring pole legs and, if expedient, also the armature, may be filled with a poorly magnetizable material 14 in those regions in which the magnetic circuit must not be closed. In such an arrangement the surfaces 15 and 16 of the armature 5 and the measuring pole 8 oriented to one another are accurately ground after inserting the material 14.

While FIGS. 1 and 3 show an embodiment in which the signal tapping is effected from the solenoids of the holding magnets proper in a manner which will be described in further detail later, in the embodiment according to FIG. 11 an additional induction coil 17 and a permanent magnet 18 are provided in the region of at least one of the measuring pole legs. In other aspects the structure of this arrangement corresponds to that described in connection with FIG. 2. In the embodiment shown in FIG. 11, only one measuring pole leg 8 is provided which has a measuring pole 10 and to which a permanent magnet 18 is attached at a clearance from the measuring pole 10. The induction coil 17 is situated between the permanent magnet 18 and the measuring pole 10 and is connected with the current conductors 21 and 22 of the solenoid 2 by means of leads 19 and 20.

Figure 11:
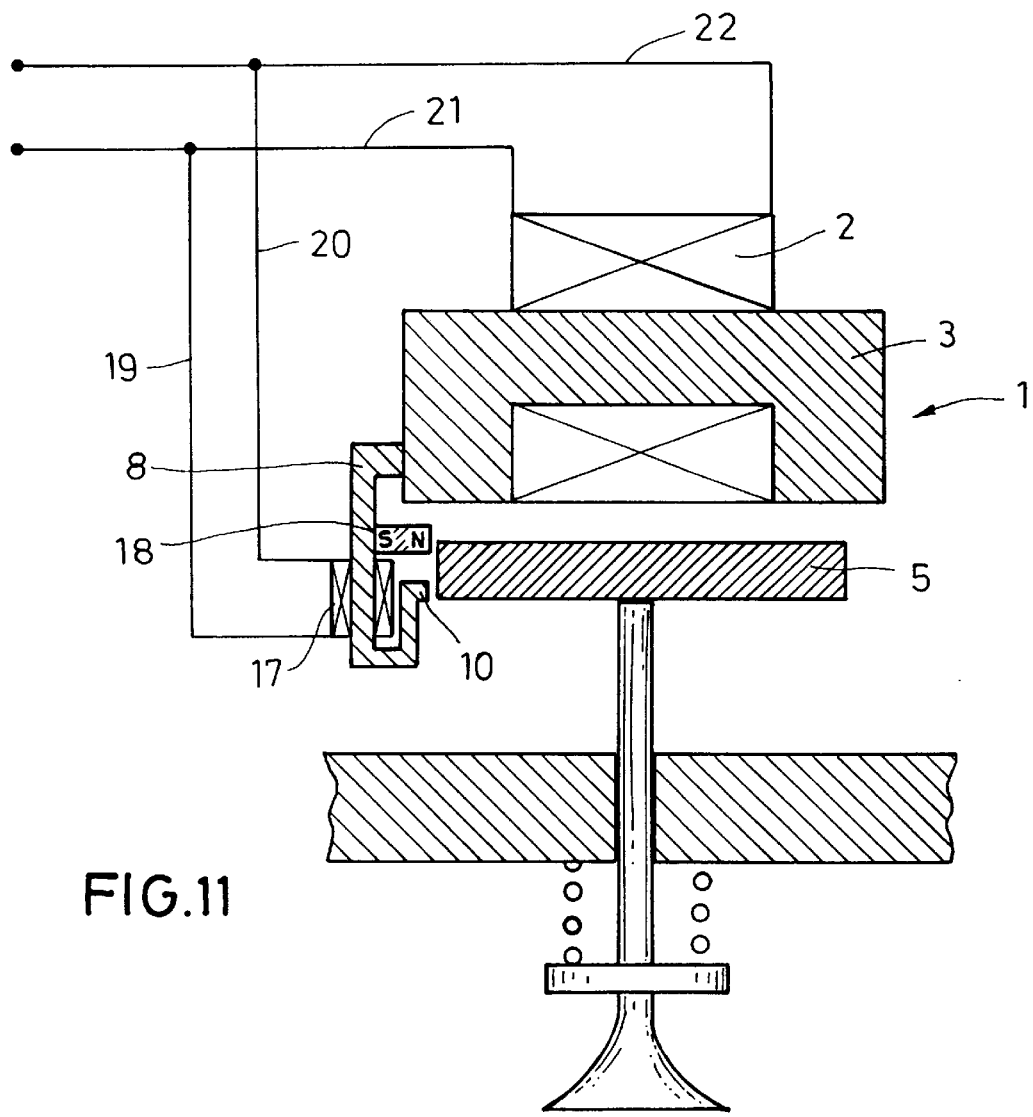
FIG. 11 is a sectional side elevational view of a preferred embodiment operating with a single measuring pole leg.

In the arrangement illustrated in FIG. 11 which thus includes a permanent exciter, in the course of its motion the armature 5 closes the magnetic circuit which is formed of the measuring pole leg 8 and the permanent magnet 18. As a result, the magnetic flux increases in the magnetic circuit, and the flux change induces a voltage in the induction coil 17. By virtue of the fact that the induction coil 17 is connected by its leads 19 and 20 parallel to the solenoid 2 of the holding magnet 1, the number of connections to the electronic control system is maintained small. The current outflow caused by such a shunt circuit is, for all practical purposes, negligible because, due to the inductive behavior of the coils, a sudden voltage increase does not cause a sudden change in the current.

Figure 12:
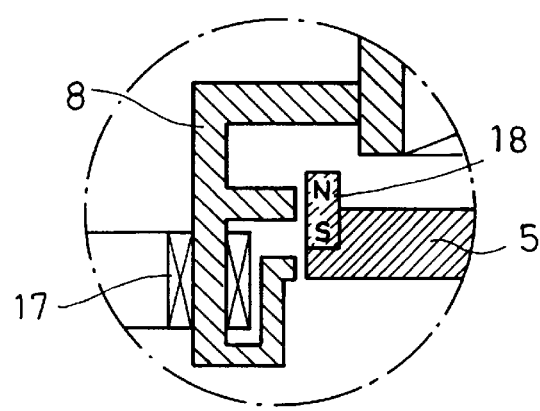
FIG. 12 is an enlarged modified detail of the construction shown in FIG. 11.

FIG. 12 shows a variant in which the permanent magnet 18 is built into the armature 5 rather than being attached to the measuring pole leg 8 as in the FIG. 11 construction.

The advantage of the arrangements shown in FIGS. 11 and 12 resides in that the magnetic flux does not need to be built up first by the energizing current of the solenoids, since the magnetic circuit for the flux is already present. This results in a more rapid response-behavior and thus in a higher time resolution. In the embodiments of FIGS. 11 and 12 it is thus of advantage to make the measuring pole legs of sheet iron or sintered material to reduce eddy currents which would counteract a rapid build-up of the electromagnetic field.

Figure 13:
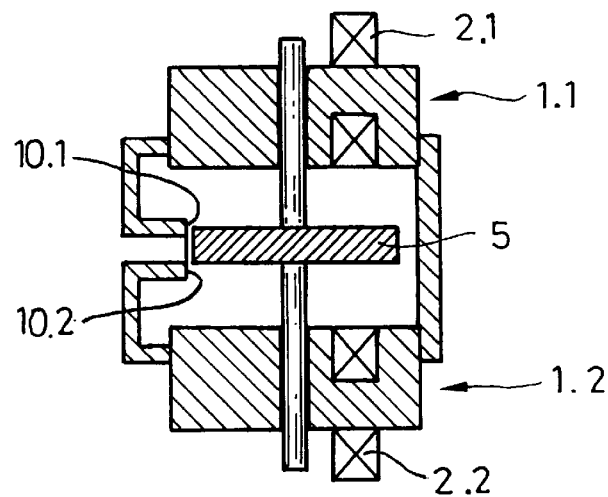
FIGS. 13, 14 and 15 are sectional side elevational views of three additional variants.

In the variant shown in FIG. 13, the magnetization of the armature 5 is effected by a coupling between the upper and the lower holding magnets 1.1 and 1.2 as the armature 5 moves past the measuring poles 10.1 and 10.2. If, for example, a current flows through the coil 2.1 of the upper magnet 1.1, then, as the armature 5 moves past, the magnetic circuit is closed so that the flux change generates a voltage in the coil 2.2 of the lower, then inactive holding magnet 1.2 which voltage may be subsequently evaluated.

Figure 14:
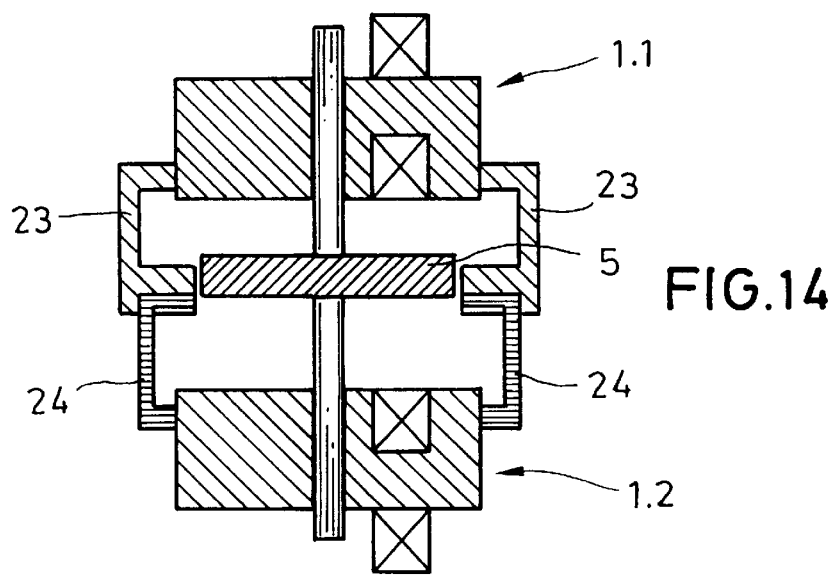
Figure 15:
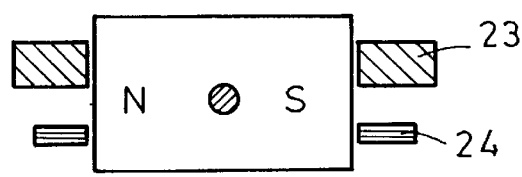

FIG. 14 illustrates an arrangement in which the magnetizing of the armature 5 is effected by means of an additional magnetizing leg pair 23. The measurement is performed with the aid of measuring pole legs 24 secured to the holding magnet 1.2. For this purpose, prior to the expected passage of the armature 5 at the measuring poles of the measuring pole leg pair 24 the holding magnet 1.1 is supplied with current so that the armature 5 is gradually magnetized as shown schematically in FIG. 15. Upon passage of the armature 5 at the measuring poles of the measuring pole leg pair 24 the armature 5 acts as a permanent magnet and induces a voltage in the solenoid of the holding magnet 1.2. This arrangement may be modified, for example, by a construction as it was described in connection with FIG. 11.

In the description which follows the operation of the apparatus for controlling an electromagnetically operated cylinder valve of an internal combustion engine will be set forth.

Figure 16:
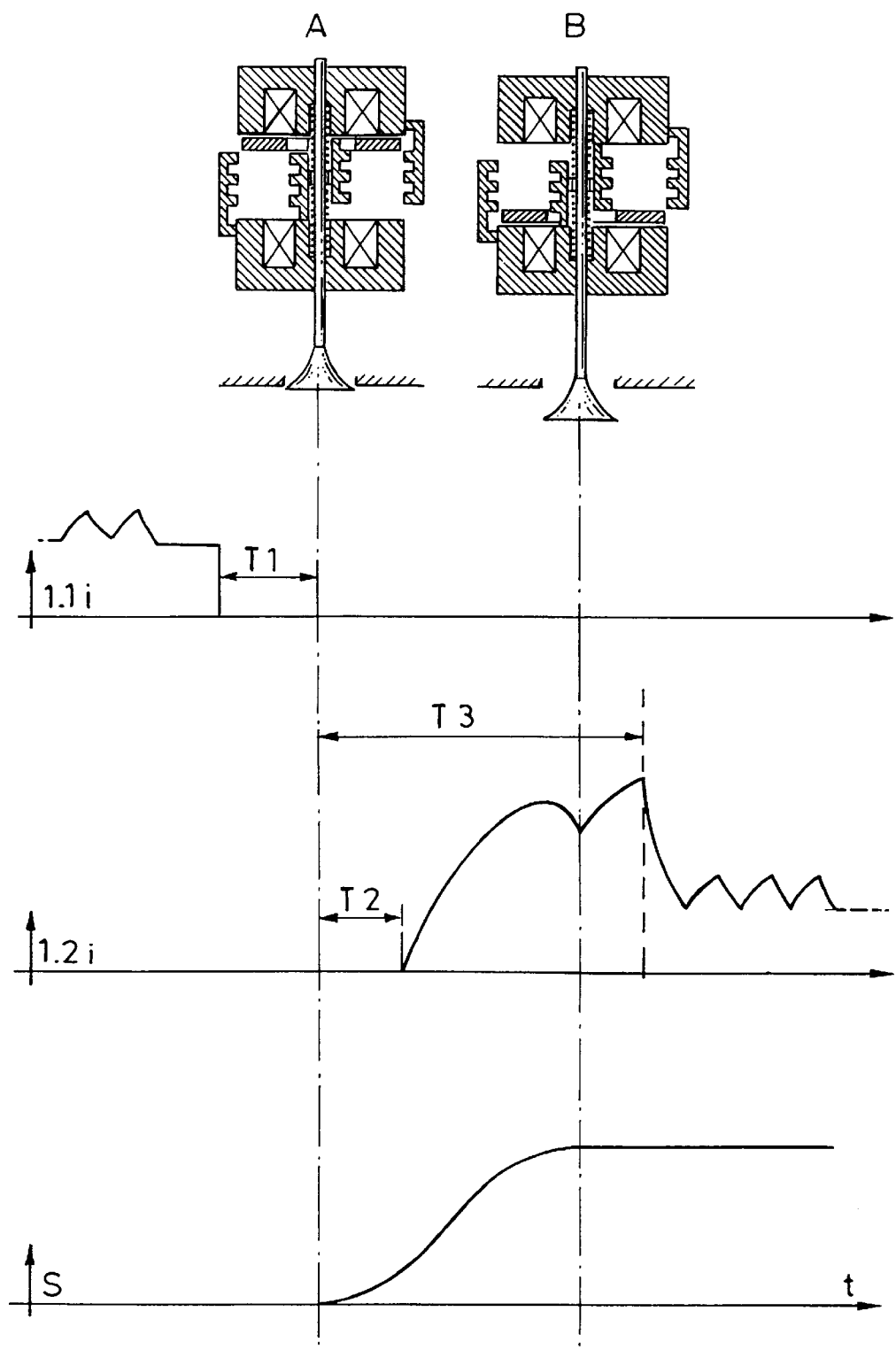
FIG. 16 is a diagram illustrating the time-dependent armature displacement and solenoid current in a cylinder valve.

FIG. 16 shows an electromagnetically operated cylinder valve 12, wherein the left-hand representation shows the closed position A and the right-hand representation illustrates the open position B. The structure of the cylinder valve corresponds, including its electromagnetic operating arrangement, to that described in connection with FIG. 3 which is therefore referred to in describing the operation. In the energized state of the solenoid of the holding magnet 1.1, the valve 12 is held in its closed position A. Upon de-energization of the holding magnet 1.1 and energization of the holding magnet 1.2, under the effect of the biased spring 7 and the increasing magnetic field of the holding magnet 1.2, the armature 5 is moved in the direction towards the holding magnet 1.2 so that the cylinder valve is moved into the open position B.

In an internal combustion engine at least one intake valve and at least one exhaust valve are provided for each cylinder so that in each instance the cylinder valve operating as an intake valve or an exhaust valve is moved in the above-described manner corresponding to the operating cycle determined by the reciprocation of the piston.

In FIG. 16, underneath the closed position A and the open position B of the cylinder valve the respective solenoid currents are shown related to the associated time axis. In the closed position A the holding magnet 1.1 is energized by the holding current 1.1$i$ so that the valve 12 is held in its seat. To move the valve 12 into the open position, the holding current 1.1$i$ is de-energized. As a function of the force of the biased spring 7 the armature 5, together with the valve 12, starts to move after a certain sticking period T1. Upon lapse of a determined period T2 after the armature motion has started, the holding magnet 1.2 is energized by a catching current 1.2$i$ which ensures that the armature 5 to be moved towards the holding magnet 1.2 is pulled into its lower end position until the closed position B is reached. As soon as the armature 5 lies against the pole face of the holding magnet 1.2 whereby the rebounding phenomena are terminated, the catching current 1.2$i$ may be reduced to a lower level, designated as the holding current level. Such an occurrence takes place at the moment T3. The holding current is, as it may be seen from the course of the current in FIG. 16, oscillated between a lower and an upper level in order to reduce current consumption. If the cylinder valve is again to be closed, the holding current flowing through the holding magnet 1.2 is switched off so that the above-described motion process occurs in the reverse sequence, that is, the cylinder valve, after a sticking period again moves, the armature 5 is caught by the upper holding magnet 1.1 and after reducing the holding current it is held in the closed position by the holding current 1.1$i$. The time-related displacement path of the armature 5 is shown underneath the two current curves 1.1$i$ and 1.2$i$.

Figure 17:
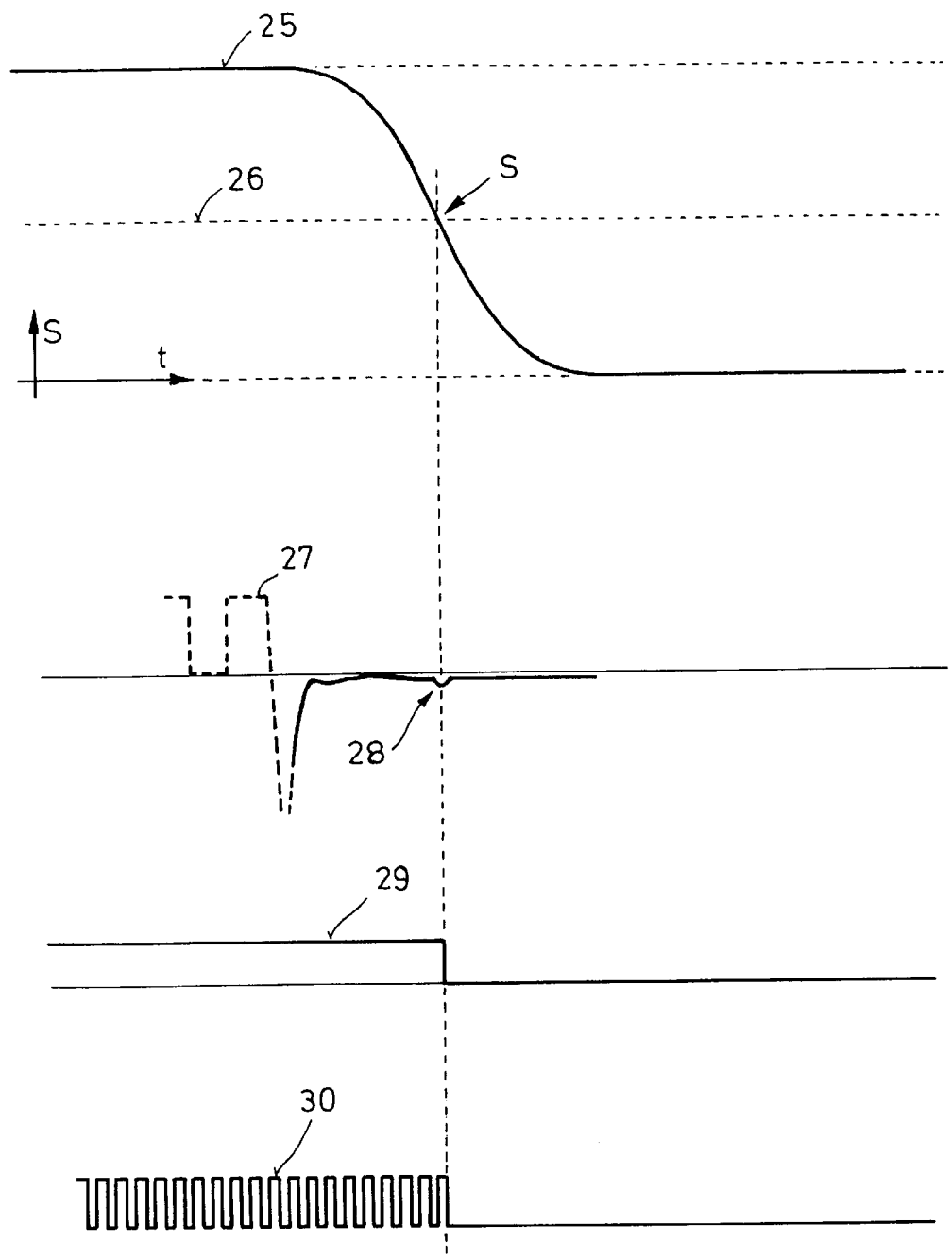
FIG. 17 is a diagram illustrating the relationship between displacement, current and time in a device having a single measuring pole.

The arrangement shown in FIG. 16 utilizes several measuring poles at the measuring pole leg pairs. Based on such an arrangement, FIG. 17 shows the principle for recognizing the armature velocity which is a measure for the kinetic energy of the armature. Furthermore, it is shown as an example how the velocity information may be utilized for adjusting the catching current level. The illustration in FIG. 17 is based on a construction which has one measuring pole for each measuring pole leg.

The curve 25 illustrates the motion path of the armature 5 from the closed position (upper position) into the open position (lower position) as a function of time t. The measuring poles 10 of the two measuring pole legs 8 and 9 are disposed in the mid position of the armature 5 between the two holding magnets 1.1 and 1.2. Such a mid position is represented by the level line 26. The point S on the motion curve 25 shows the moment of passage of the armature 5 through the mid position. The curve 27 shows the voltage for the solenoid of the holding magnet 1.1 as a function of time. The dash-line course shows the voltage course corresponding to the holding current 1.1 $i$ as indicated in FIG. 16. After the holding current 1.1$i$ is de-energized and a certain sticking period has elapsed, the armature 5 separates from the pole face of the holding magnet 1.1. At the moment the armature 5 moves past the position S determined by the measuring poles, the momentary voltage change 28 occurs which may be processed by an electronic circuit to change the level of a signal 29 to zero.

To obtain information concerning the velocity of the armature 5, the time between de-energization of the holding current and passage of the armature through the point S is measured by a time signal 30 which may be synchronized with the crankshaft angle. Thus by means of a control circuit, the de-energization of the holding current for the holding magnet 1.1 and the energization of the catching current for the holding magnet 1.2 may be varied in such a manner in coordination with the crankshaft angle, that both the opening moment and the closing moment of the valve 12 is set exactly according to the operational conditions predetermined by the control circuit.

Figure 18:
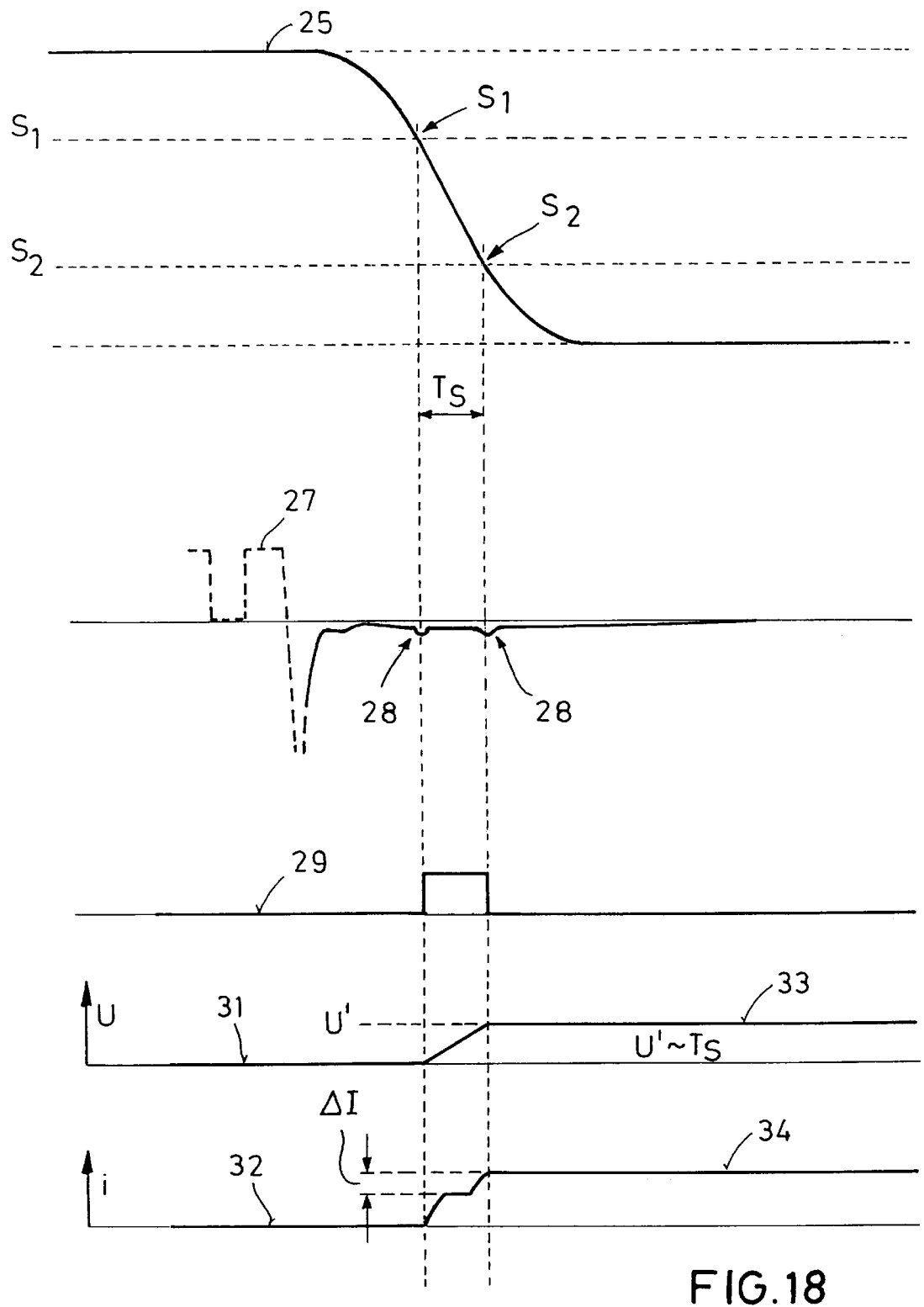
FIG. 18 is a diagram illustrating the relationship between displacement, current and time in a device having two measuring poles.

FIG. 18 shows the displacement and voltage curves as well as the associated signals for an arrangement which has two measuring poles for each measuring pole pair. The curve 25 shows the time-dependent motion of the armature 5. The armature 5 moves past the two measuring pole shoes $S_1$ and $S_2$ which are arranged between the two holding magnets in each instance at a distance from one another and at a distance from the pole faces of the holding magnets.

Curve 27 shows the voltage at the solenoid of the holding magnet 1.1. It shows the two voltage changes 28 at the moments when the armature moves past the measuring poles $S_1$ and $S_2$. From this information a signal 29 may be derived which, upon movement of the armature past the position $S_1$, changes from "0" to "1", whereas upon movement of the armature past the position S2, a change from "1" to "0" occurs. An integrator integrates the signal 29 and, as a result, a signal 31 appears at the integrator output. The terminal value 33 of the signal is proportional to the time required for the armature to cover the distance between positions $S_1$ and $S_2$ and is thus inversely proportional to the mean velocity of the armature along such a path.

The slower the armature movement, the more energy has to be supplied to the holding magnet 1.2 which functions as an opening device, to ensure that the armature is securely caught at the "valve open" end. Two possibilities are available to increase the energy supply dependent on the armature velocity: either the catching current at the holding magnet 1.2 is applied at an earlier moment or, as shown by curve 32, the level of the catching current is increased by an amount which is dependent from the armature velocity. The catching current then rises to a level 34 which in the simplest case is proportionate to the obtained voltage 33 and is thus proportionate to the "slowness" of the armature 5.

The required increase of the catching current $\Delta i$ may also be calculated from the difference between the current curve 31 and an offset $U_0$ so that by observing certain velocities $(U<U_0=T_S<T=V>V_0)$ no increase of the level of the catching current occurs.

The determination of the velocity signal is not limited to the method described above. Thus, the velocity information may be directly obtained by calculation from the height of the voltage peak 28 of the curve 27 since the voltage is proportionate to the field change and is thus the greater the higher the velocity of the armature upon its passage. Also, as an alternative to the evaluation of a voltage signal across the solenoid, an evaluation of the current signals is feasible.

Ensuring the actual correct moment of armature arrival to the pole face of the respective holding magnet is of primary importance for certain control operations, such as the opening or closing of a cylinder valve.

If the moment of arrival (moment of impact) of the armature at the pole face of the holding magnet is known, a regulation of such moment may be effected. Within certain limits even a correction of the imminent impact moment is possible by further reducing the catching current if a premature or a delayed arrival of the armature into its end position is anticipated. In accordance with a further variant, the moments of armature passage may be determined by using the already-energized "catching" solenoid. For this purpose, prior to applying the catching current proper, a measuring current is passed through the solenoid. Even while the catching current is already present, an evaluation of the moment of passage of the armature may be evaluated, for example, by linearly regulating the catching current prior to the expected passage of the armature, for example, at the position $S_2$ as shown by the current 32 within the time zone $T_S$, so that the solenoid voltage may be evaluated. In the alternative, a detection of the deviation in the current course is possible as it is generally feasible to evaluate currents instead of voltages. The courses of curves described in conjunction with FIG. 18 also make possible a control process which is not limited to the use of the above-described embodiments. Other circuit arrangements are feasible based on the circumstance that between the two oppositely located holding magnets at least two measuring points are available, by means of which the respective moment of passage of the armature may be detected. Thus, discrete sensors may be used instead of the measuring poles connected with the holding magnets. Such sensors may detect and generate a signal representing the consecutive actual moments of armature passage at the points $S_1$ and $S_2$. If the signals representing the actual moments of armature passage at the points $S_1$ and $S_2$ correspond exactly to the desired moments inputted to the control device, then no changes in the control for de-energizing the holding magnet and for energizing the catching magnet are necessary. If, on the other hand, the actual value/desired value comparison indicates a deviation, then, as a function of such deviation, the moment of de-energization of the current of the holding magnet and the moment of applying the current to the catching magnet has to be altered. Since the desired time difference $T_S$ between the passage of the armature at points $S_1$ and $S_2$ may be predetermined and thus the desired velocity for the armature and the actual velocity for the armature may be ascertained, the control device may change not only the moment of energizing the catching electromagnet but may also change the current intensity and thus the magnetic field of the catching magnet so that overall the predetermined desired total operating period may be met. The desired starting (triggering) moments in an internal combustion engine may be determined by a signal representing the angular position of the engine crankshaft.

While the above-described method may be performed with devices as described in conjunction with the Figures, the method, however, may be practiced with other devices as well.

Figure 24:
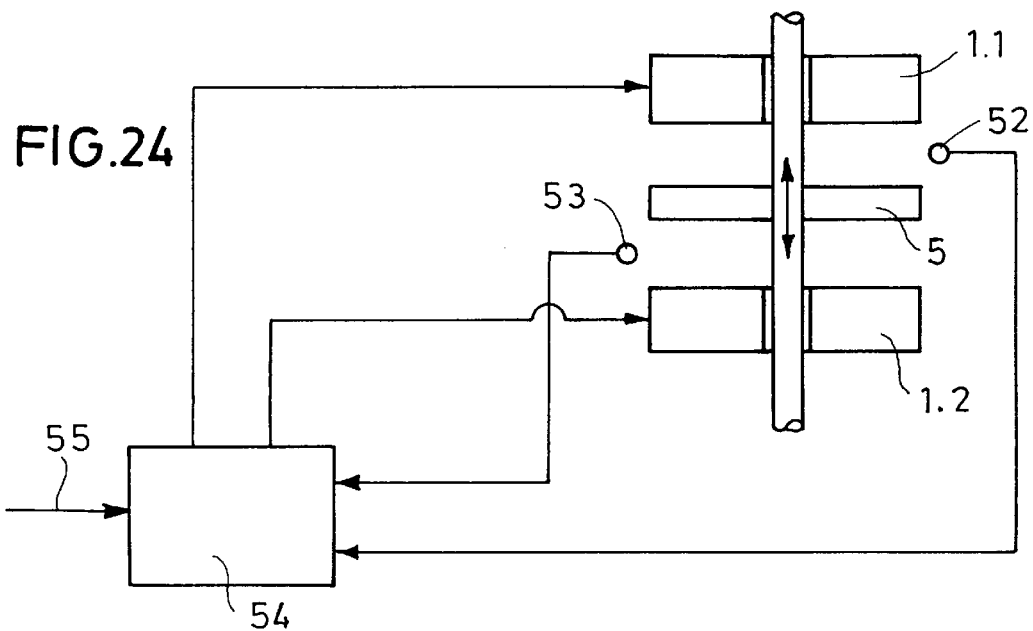
FIG. 24 shows a diagram including two separate sensors.

A different type of circuit arrangement is illustrated in FIG. 24 where two electromagnets 1.1 and 1.2 are shown between which an armature 5 is reciprocated by an alternatingly controlled energization and de-energization of the electromagnets 1.1 and 1.2. The armature 5 is associated with two sensors 52 and 53 which, upon armature motion in either direction between the electromagnets 1.1 and 1.2, the actual moment of the armature passage may be detected twice in sequence. The signals triggered by the sensors 52 and 53 are applied to a control device 54 in which they are compared with desired values supplied by a predetermined control program which itself can be altered, as concerns the predetermined desired moments, by means of an external input 55 from, for example, an electronic engine control. The moments for the energization and de-energization as well as the control of the current intensities of the momentary catching magnet are then derived from the desired value/actual value comparison of the actual values detected by the sensors 52 and 53 with the desired values predetermined in the control device 54, and the electromagnets 1.1 and 1.2 are controlled accordingly.

The above description in conjunction with FIG. 24 shows that using at least two sensors for each passage of the armature 5, in each instance at least two signals are generated from which a desired value/actual value comparison is directly possible concerning the predetermined moment of passages. Or, the actual passage velocities may be calculated and compared with predetermined desired passage velocities. This then means that the invention is also extended to a general process for controlling electromagnetic circuits which are not limited to the structural embodiments described. The advantage of such a method resides in that during the respective armature motion, by means of detecting the moment of armature passage through at least two predetermined positions between the two holding magnets, an accurate actual moment determination is possible which is independent from any sticking periods.

In the conventional methods and in methods which operate only with a single position sensor situated between the two holding magnets, only the moment of current turn-off and the moment of the armature passage at the sensor can be detected and thus the sticking period is always present in an undefined manner in the result yielded by the time detection. The above-described method of the invention, on the other hand, provides the possibility to make substantially accurate predictions concerning the actual sticking periods. Such predictions are made in conjunction with the moment of de-energization of the holding current based on the two-fold positional detection, that is, on the determination of the actual value of two moments at predetermined positions during armature passage. For a control process, however, such a prediction by itself is of little significance because what is of importance is to shift the moment of de-energization based on the two measured actual values of the armature passage as compared to the predetermined desired values of such armature passage.

The same also applies, as described in detail in conjunction with FIGS. 17 and 18, for switching on the catching current and also for the control of the catching current intensity, since an acceleration or a deceleration of the armature motion is required by controlling the catching current intensities, based on the actual moments of armature passage detected by the two sensors 52 and 53. This is of significance, for example, for a compliance with the exact closing moment of a cylinder valve where too, a control of the current intensity is feasible by shifting the moments of closing.

Based on the illustrations in FIG. 16 as well as the diagrams shown in FIGS. 17 and 18, a circuit will be described in detail in conjunction with FIG. 19 in which a position recognition and a switching of the holding magnets 1.1 and 1.2 is possible in conjunction with a superordinated control circuit (not described) for the entire internal combustion engine.

Figure 19:
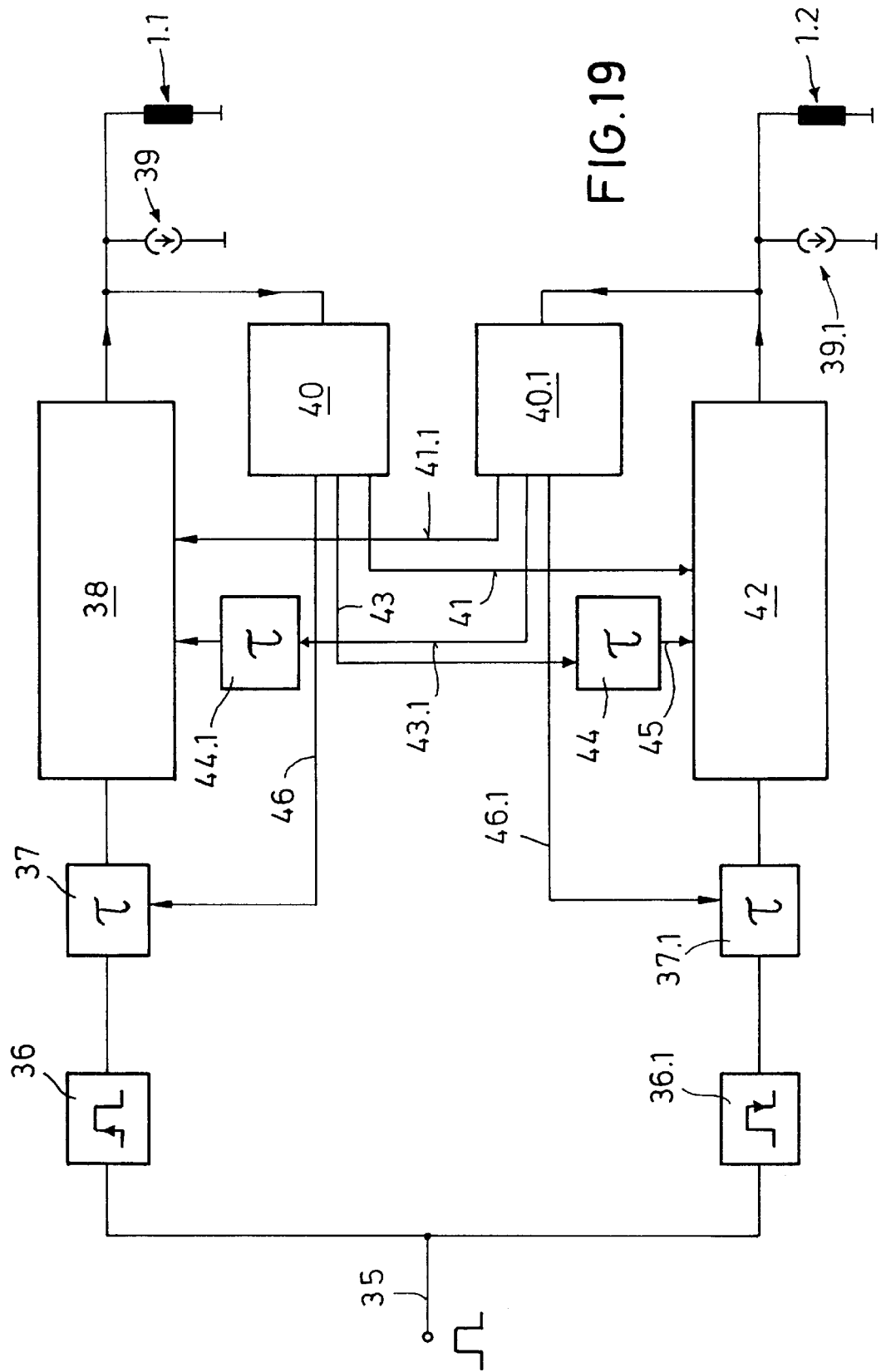
FIG. 19 is a block diagram for evaluating the measuring signal for a device controlling a cylinder valve.

The circuit illustrated in FIG. 19 is associated with each cylinder valve to be operated and is connected, by means of the signal input 35 with a superordinated overall engine-control circuit in which other operational data such as rpm, engine temperature, position of the accelerator pedal, crankshaft angle and other operationally relevant data are processed. If now a certain cylinder valve is to be operated (for example, opened), a valve-control signal, schematically shown as a square signal, is applied to the input 35. The leading flank of the signal initiates the opening process and its trailing flank initiates the closing process for the valve. For this purpose, by means of a leading flank detector 36 and a variable-delay member 37 a command signal is generated for de-energizing the holding current in the solenoid of the holding magnet 1.1 functioning as a closing device. The command signal is applied to the end stage 38 which turns off the holding current through the solenoid of the closing magnet 1.1, and replaces it by a smaller measuring current which is generated by an additional current source 39. As the armature moves past a measuring pole (position $S_1$ in the motion curve of FIG. 18), a voltage change at the solenoid of the closing magnet 1.1 occurs which is evaluated in a position detector 40. The output 41 of the position detector 40 is connected with an end stage 42 of the opening magnet 1.2 and effects an energization of the catching current for the solenoid of the opening magnet 1.2. As soon as the armature passes the position $S_2$ of a second measuring pole, a second output 43 of the position detector 42 is activated. After a delay by means of a timing member 44, the opening end stage 42, based on the output signal 45, switches over to the holding current which is less than the catching current, as described in conjunction with FIG. 16 where such a current switchover occurs after a delay T3. The delay period of the delay member 44 is so selected that the armature has arrived securely to the pole face of the opening magnet 1.2 at the time of the switchover to the holding current.

Further, the position detector 40 generates a signal 46 which serves for the compensation of the sticking times at the closing magnet 1.1. For this purpose, the position detector 40 compares the signal of the leading flank detector 36 with an armature position signal 28 (FIG. 18) detected upon the passage of the armature. If the signal representing the motion of the armature past a measuring pole occurs later than preset with respect to the leading flank of the valve actuating signal, then a correction of the delay period is effected. In this manner a regulating circuit is formed for regulating the alternating sticking times. The procedure for the closing process is carried out in a mirror image fashion. For this purpose, the circuit includes a trailing flank detector 36.1, a delay member 37.1 as well as a position detector 40.1 for the opener. The position detector 40.1 generates signals 41.1, 43.1 and 46.1 which are applied to the end stage 38, the delay member 44.1 and the delay member 37.1, respectively. The coil of the opening magnet 1.2 too, is connected with the measuring current source 39 by means of a corresponding circuit or is provided with its own measuring current source 39.1.

Figure 20:
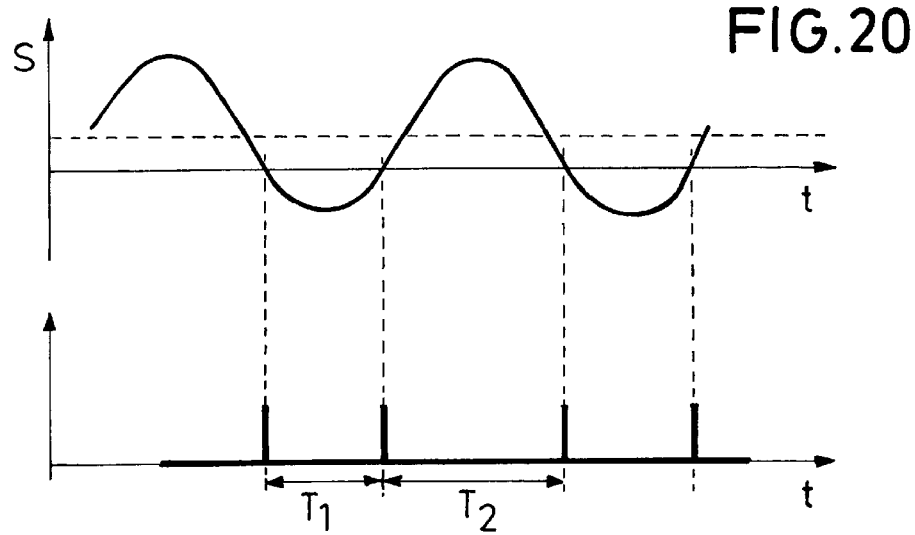
FIG. 20 is a diagram illustrating the adjustment to a central position.
Figure 22:
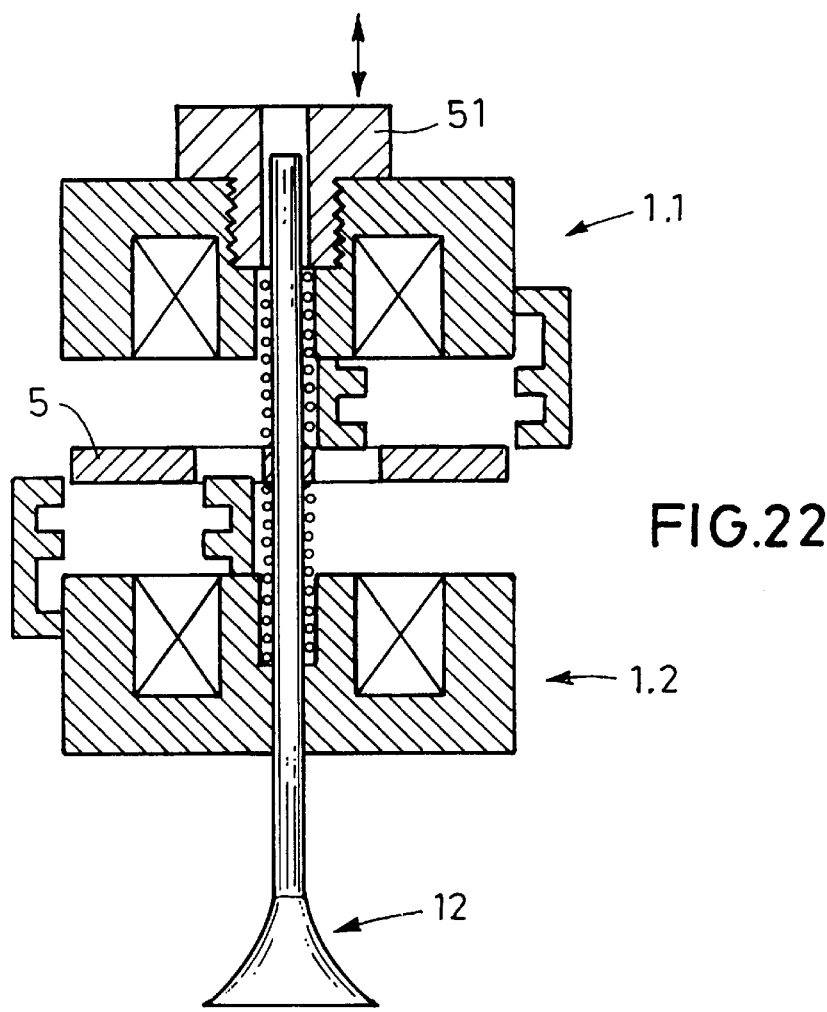
FIG. 22 is a sectional side elevational view of a device according to the invention, settable with respect to a mid position.

The measuring of the inductivity of the holding-magnet coils may be effected at least in case of a slow armature motion or during a standstill of the armature with the aid of a measuring bridge or by means of reactance measurement. For this purpose a high-frequency current is superposed on the solenoid-energizing current. In an arrangement with opening and closing magnets according to FIG. 3, with the aid of the above-described measuring process during armature standstill an information may be derived concerning the correct setting of the mid-position of the armature in relation to the pole faces of the two holding magnets. In this manner an improvement in the accuracy may be obtained if the armature is set into oscillations about the mid position. For evaluating the generated signals, the time delay between two determined passages of the armature at the measuring poles may be ascertained and utilized, as illustrated in FIG. 20. The mid position has to be mechanically adjusted until the magnitudes $T_1$ and $T_2$ are the same. FIG. 22 shows an arrangement according to FIG. 3 in which the mid position of the armature 5 connected with a cylinder valve 12 may be adjusted by a setting means (adjusting device) 51 relative to the pole faces of the two holding magnets 1.1 and 1.2.

A further variant for determining the mid position is available in case several measuring poles for each measuring pole leg pair are present and the measuring poles are spaced symmetrically to the theoretical mid position. The armature is excited to oscillate as long as the oscillation amplitude is sufficient to generate a signal at both measuring poles. The timewise width of the signals has to be compensated for by adjusting the mid position. This process may also be utilized for other positions of rest of the armature if for operational reasons the position of rest should not be at the half distance between the pole faces of the two magnets.

Measuring pole legs having measuring poles which are situated externally of the mid position (that is, they are rearwardly offset relative to the associated holding magnets as shown in FIG. 22) may facilitate the starting step for the setting member (valve) 12. On the one hand, when larger currents are applied to the momentary holding magnet, an additional force may be already applied to the armature in a position in which the distance from the pole faces proper is still too large for overcoming the spring force at that location with a "normal" operating current. The current intensities required therefor have to be only slightly increased relative to the operating current. On the other hand, with the aid of the position determination for the armature, the best moment for energization and/or switchover of the current flow to the solenoids may be determined to achieve an effective oscillation start.

Figure 23:
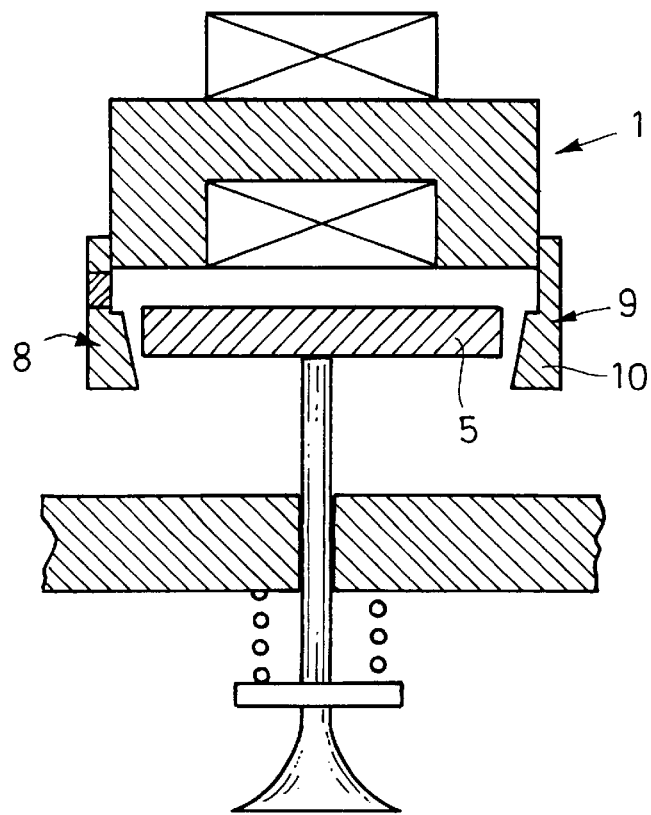
FIG. 23 is a sectional side elevational view illustrating particularly shaped measuring poles.

By utilizing a linearized output signal for the armature displacement with the aid of comparator circuits, certain events, such as the energization of the catching current, may be initiated. FIG. 23 illustrates an embodiment which is a variant of the FIG. 1 arrangement and which allows the generation of linearized output signals for the armature displacement. FIG. 23 differs from FIG. 1 in that the two measuring pole legs 8 and 9 are provided with one or several measuring poles 10 whose pole faces oriented towards the armature 5 have, related to the direction of armature motion, an inclined orientation for forming a contoured air gap. The inclination of the pole faces which need not be planar or linear is such that the output signals derived therefrom are essentially of linear course.

Figure 21A:
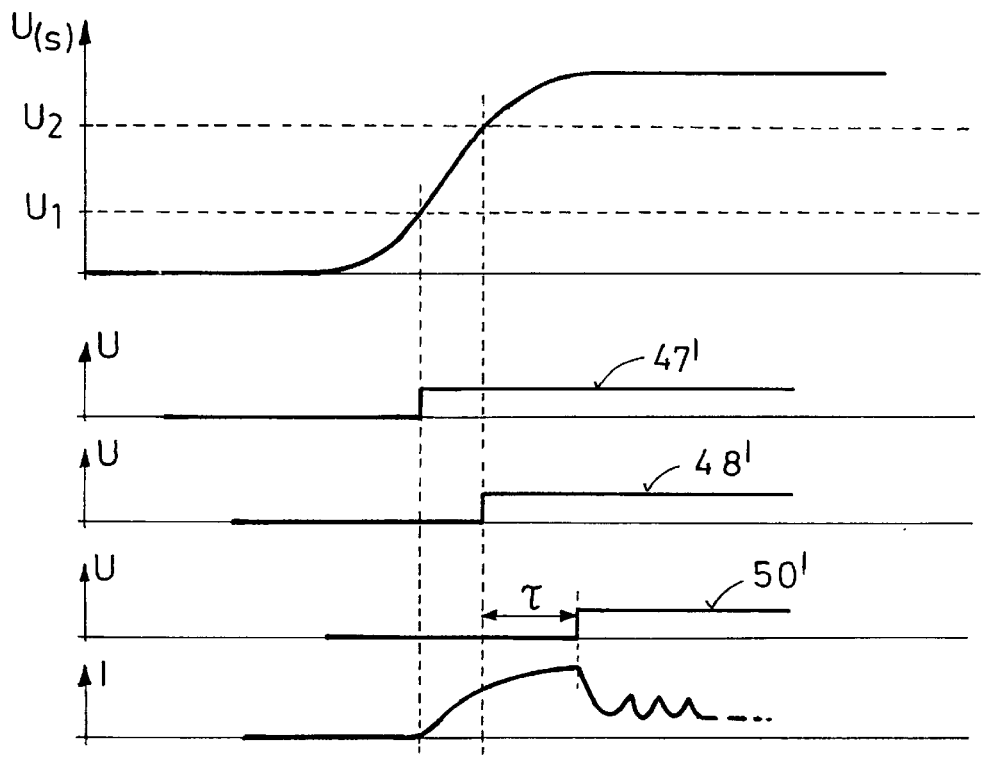
FIG. 21*a* illustrate diagrams of time/voltage and time/current relationships of signals generated by the circuit of FIG. 21.
Figure 21:
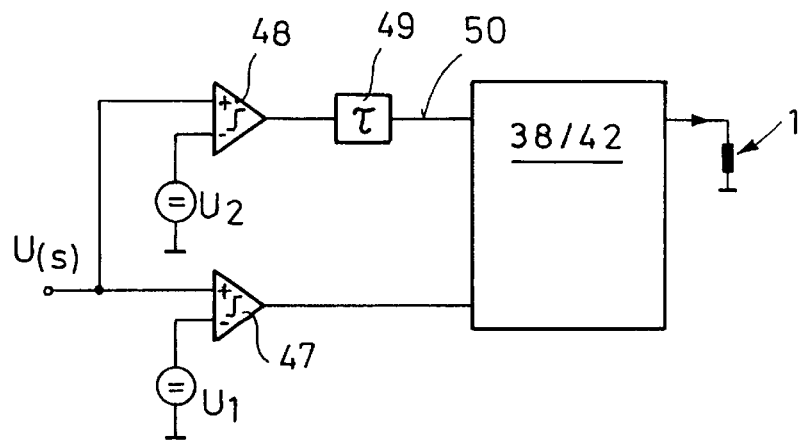
FIG. 21 is a diagram of an additional control circuit.

In case in a circuit as shown in FIG. 21 a voltage $U_1$ is exceeded by the path signal, the output of a comparator 47 is changed from a level "0" to a level "1" and thus an energization of the catching current in the end stage 38 or 42 is effected which is represented by the voltage curve $U_{47}$.

Upon exceeding a second voltage $U_2$, a second comparator 48 changes its output from a level "0" to a level "1". By means of a delay member 49 a signal 50 with a delay τ is generated and applied to the end stage of the solenoid of the corresponding holding magnet and provides for a resetting of the current to the holding current level. FIG. 2a illustrates the respective voltage curves 47', 48' and 50' generated by the respective components 47, 48 and 50 of the circuit shown in FIG. 21. Below the voltage curves the solenoid current curve is illustrated, showing a current increase up to a level of the catching current and, after a delay of τ, a decrease to the level of the holding current which, as also shown, oscillates during the holding period.

It will be understood that the above description of the present invention is susceptible to various modifications, changes and adaptations, and the same are intended to be comprehended within the meaning and range of equivalents of the appended claims.

What is claimed is:

1. A method for controlling armature movement in an electromagnetic circuit, comprising the following steps:

(a) providing two spaced, facing electromagnets;

(b) providing an armature movable between the two electromagnets along a motion path;

(c) generally alternatingly energizing and de-energizing the two electromagnets for causing a reciprocating motion of the armature, whereby periodically one of the two electromagnets is a momentarily catching electromagnet and the other of the two electromagnets is a momentarily releasing electromagnet;

(d) detecting the actual moments of passage of the armature during each motion from one electromagnet to the other at least at two consecutive locations along the motion path;

(e) comparing signals representing the actual moments of passage with signals representing desired moments of passage of the armature at said at least two locations; and (f) dependent upon deviations determined in step (e), controlling the moment of de-energizing the momentarily releasing electromagnet and controlling the moment of energizing the momentarily catching electromagnet.

2. The method as defined in claim 1, wherein step (f) includes the step of controlling, dependent upon deviations determined in step (e), the intensity of current flowing through said momentarily catching electromagnet.

3. A method for controlling armature movement in an electromagnetic circuit, comprising the following steps:

(a) providing two spaced, facing electromagnets;

(b) providing an armature movable between the two electromagnets along a motion path;

(c) alternatingly energizing and de-energizing the two electromagnets for causing a reciprocating motion of the armature, whereby periodically one of the two electromagnets is a momentarily catching electromagnet and the other of the two electromagnets is a momentarily releasing electromagnet;

(d) detecting the actual moments of passage of the armature during each motion from one electromagnet to the other at least at two consecutive locations along the motion path;

(e) comparing signals representing the actual moments of passage with signals representing desired moments of passage of the armature at said at least two locations; and (f) dependent upon deviations determined in step (e), controlling the moment of de-energizing the momentarily releasing electromagnet and controlling the intensity of current flowing through the momentarily catching electromagnet.

4. A method for controlling armature movement in an electromagnetic circuit, comprising the following steps:

(a) providing two spaced, facing electromagnets;

(b) providing an armature movable between the two electromagnets along a motion path;

(c) alternatingly energizing the two electromagnets for causing a reciprocating motion of the armature about a position of rest;

(d) determining the moments the displacement/time curve of the armature passes consecutive zero values for a given setting of the position of rest; and (e) adjusting said position of rest along said motion path until the time intervals between consecutive zero values are identical.

* * * * *